J. M. DODGE.

CONVEYER.

No. 11,548. Reissued June 23, 1896.

Witnesses.
Am Long.
Alex. Scott

Inventor:
James M. Dodge,
By Howson & Howson
his Attys.

UNITED STATES PATENT OFFICE.

AMES M. DODGE, OF PHILADELPHIA, PENNSYLVANIA, ASSIGNOR TO THE AIR CONVEYOR COMPANY, OF SAME PLACE AND CAMDEN, NEW JERSEY.

CONVEYER.

SPECIFICATION forming part of Reissued Letters Patent No. 11,548, dated June 23, 1896.

Original No. 557,058, dated March 24, 1896. Application for reissue filed May 11, 1896. Serial No. 591,183.

*To all whom it may concern:*

Be it known that I, JAMES M. DODGE, a citizen of the United States, residing in Philadelphia, Pennsylvania, have invented certain Improvements in Conveyers, (combined suction and pressure,) of which the following is a specification.

My invention is based on the patent granted to me on the 20th day of August, 1895, No. 545,013; and the object of my present invention is to construct an apparatus in which the material is conveyed by the combined action of fluid under pressure and suction. This object I attain in the following manner, reference being had to the accompanying drawings in which—

Figure 3:
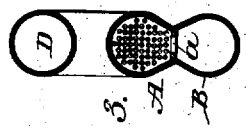
Figure 1:
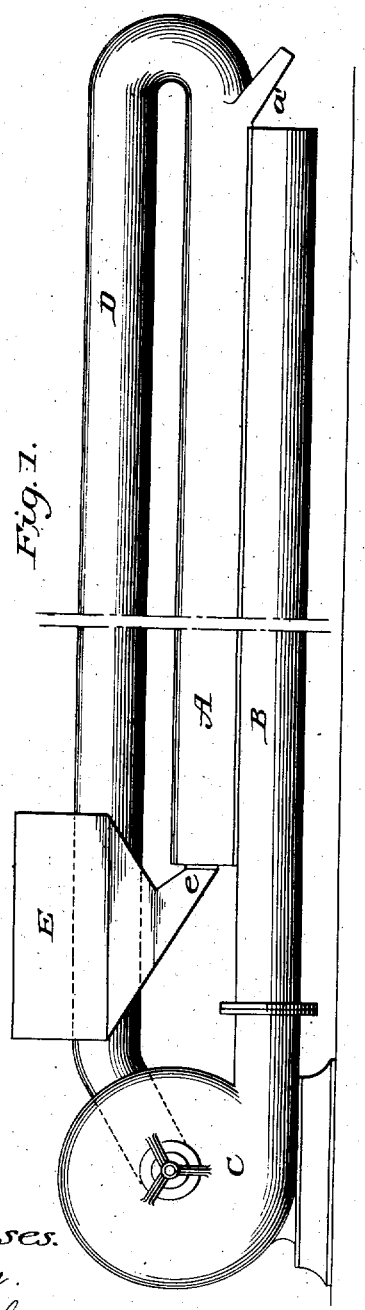
Figure 2:
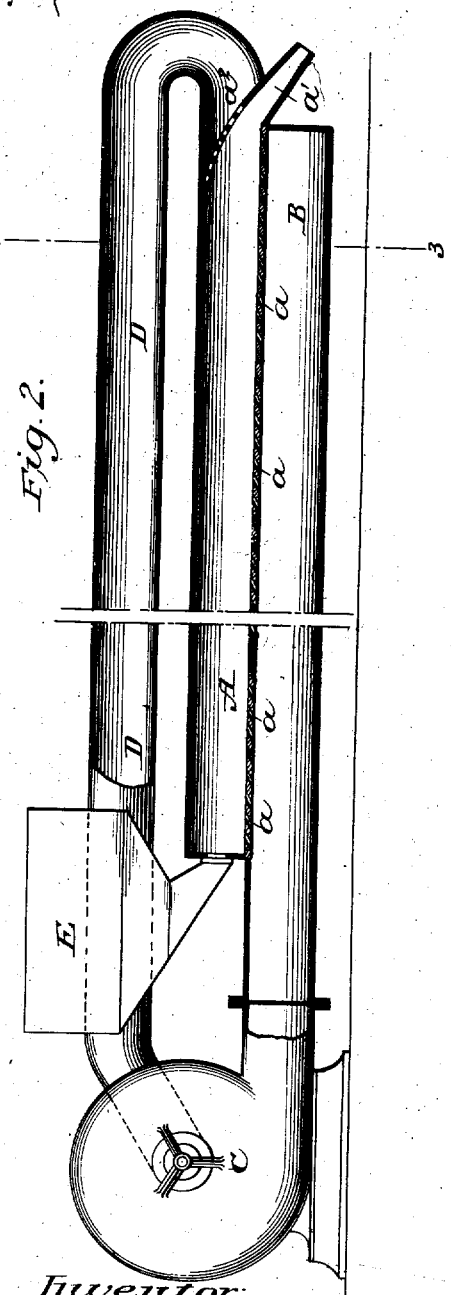

Figure 1 is a side view of my improved apparatus. Fig. 2 is a longitudinal sectional view of the conveyer portion of the apparatus. Fig. 3 is a transverse section on the line 3 3, Fig. 2.

A is a tubular conveyer closed throughout its entire length with the exception of a series of openings *a* at the bottom. These openings are inclined toward the outlet end, so that air entering the conveyer through the openings will act to feed the material along the conveyer as well as to sustain it in its travel.

B is an air-tube, in the present instance directly under the tubular conveyer A and communicating with it through the openings *a*, as clearly indicated in Figs. 2 and 3. One end of this tube is closed, and to the other end is connected the fan or blower C, which is of the ordinary construction. A fan pressure-blower in the present instance is shown driven by belting, the fan and tube B being of such a capacity that a volume of air will be maintained at all times in said tube.

The opposite end of the conveyer-tube A is connected to a suction-tube D, and this tube is connected in turn to the inlet of the fan or blower C, as indicated, so that the fan will draw air from the conveyer-tube and exhaust into the tube B, thus forming a continuous current of air in the conveyer. By this means the material to be conveyed is not only subjected to the influence of the incoming air released from pressure, but is also under the influence of the suction apparatus, so that a closed conveyer-tube can be used instead of an open conveyer-tube, as illustrated in my patent above mentioned.

The material in the present instance is fed from a hopper E through a neck *e* to the inlet end of the conveyer-tube, and this hopper may be provided with a suitable valve for regulating the flow of material to the conveyer, and at the opposite end of the conveyer A is a discharge-opening *a'*, and directly above this discharge-opening is a curved screen $a^2$ to prevent the material from passing into the suction-tube D, and this screen is curved in the present instance over the discharge-opening *a'*, so that it will direct the material to the discharge-opening. The lower portion of the screen is preferably made solid, acting as a complete check for the material.

It will be understood that other means may be provided for feeding the material to the conveyer and that a receptacle or conveyer may be used to carry the material away from the outlet.

While I have shown a single fan-blower used for creating the suction as well as the blast, two fans may be used, one a suction-fan and the other a pressure-fan, or other forms of blowers to create the air-current may be used without departing from my invention.

I claim as my invention—

1. The combination of the conveyer-tube having openings in the bottom and having an inlet and an outlet for the material, a tube B communicating with the conveyer through said openings, a suction-tube D connected to the discharge end of the conveyer, and means for forcing air under pressure into the tube B and for reducing the pressure in the suction-tube D, substantially as described.

2. The combination in a conveyer-tube A, having openings in the bottom and having an inlet and outlet for the material, a pressure-tube B communicating with the conveyer through said openings, an exhaust-tube D connected to the discharge end of the conveyer-tube A and a fan connected to both tubes, substantially as described.

In testimony whereof I have signed my name to this specification in the presence of two subscribing witnesses.

JAMES M. DODGE.

Witnesses:
WILL. A. BARR,
F. E. BECHTOLD.